(12) United States Patent
Rand

(10) Patent No.: US 10,420,326 B1
(45) Date of Patent: Sep. 24, 2019

(54) DUAL-DOG LEASH WITH ENHANCED STABILITY

(71) Applicant: Jordan Michael Anthony Rand, Chandler, AZ (US)

(72) Inventor: Jordan Michael Anthony Rand, Chandler, AZ (US)

( * ) Notice: Subject to any disclaimer, the term of this patent is extended or adjusted under 35 U.S.C. 154(b) by 184 days.

(21) Appl. No.: 15/709,229

(22) Filed: Sep. 19, 2017

Related U.S. Application Data

(60) Provisional application No. 62/397,210, filed on Sep. 20, 2016.

(51) Int. Cl.
*A01K 27/00* (2006.01)

(52) U.S. Cl.
CPC .......... *A01K 27/003* (2013.01); *A01K 27/005* (2013.01)

(58) Field of Classification Search
CPC ..... A01K 27/00; A01K 27/003; A01K 27/005
See application file for complete search history.

(56) References Cited

U.S. PATENT DOCUMENTS

| 6,247,428 B1* | 6/2001 | Mireles ................ A01K 27/003 119/771 |
| 8,151,737 B1 | 4/2012 | Alonzo |
| 2009/0120376 A1 | 5/2009 | Foster |
| 2013/0139764 A1* | 6/2013 | Hill ...................... A01K 27/003 119/795 |
| 2017/0245470 A1* | 8/2017 | Renforth ............. A01K 27/003 |

\* cited by examiner

*Primary Examiner* — Monica L Williams
*Assistant Examiner* — Aaron M Rodziwicz
(74) *Attorney, Agent, or Firm* — Plager Schack LLP; Mark H. Plager; Eric Liou

(57) ABSTRACT

A dual-pet leash to secure a pair of dogs includes a hub body having a first internal channel with an inlet connected to a pair of outlets and a second internal channel, a first cord coupled to a guide fastener and oriented such that a pair of ends of the first cord extend through the inlet and out the pair of outlets of the first internal channel, a second cord disposed within the second internal channel and oriented such that a pair of ends of the second cord extend out the hub body, a first securement fastener coupled to the first end of the first cord, first end of the second cord and the first dog, and a second securement fastener coupled to the second end of the first cord, second end of the second cord and the second dog. The user maneuvers the guide fastener to control the dogs.

10 Claims, 4 Drawing Sheets

DUAL-DOG LEASH WITH ENHANCED STABILITY

RELATED APPLICATION

The application claims priority to provisional patent application U.S. Ser. No. 62/397,210 filed on Sep. 20, 2016, the entire contents of which is herein incorporated by reference.

BACKGROUND

The embodiments herein relate generally to leashes for use with pets such as dogs.

Individuals uses leashes to secure and control their dogs during a walk or run. Typically the leash is secured to a collar or harness worn by the dog. By grabbing the leash, the user can maintain control of the dog. It becomes challenging when individuals walk multiple dogs at the same time. Using separate leashes for the dogs require constant hand switching and turning around to untangle the leashes.

Several prior art multi-dog leashes have been developed as disclosed in U.S. Pat. No. 8,151,737 and U.S. Patent Application 2009/0120376. However, these leash devices are limited because they comprise cords that can easily tangle and/or the leash devices lack stability during use because they do not effectively balance or distribute forces generated from the secured dogs. Therefore, these leash devices may frustrate users due to their difficult operation and limited effectiveness.

As such, there is a need in the industry for a dual-dog leash for use in securing a pair of dogs that addresses the limitations of the prior art, which reduces the likelihood of cord entanglement and enhances device stability and user control of the dogs.

SUMMARY

A dual-pet leash for use by a user to secure a pair of dogs is provided. The dual-pet leash is configured to distribute and balance forces generated by the pair of secured dogs to enhance stability and user control. The dual-pet leash comprises a hub body comprising a first internal channel and a second internal channel, the first internal channel comprising an inlet connected to a pair of outlets, the second internal channel disposed therethrough the hub body, a first cord coupled to a guide fastener and oriented such that a pair of ends of the first cord extend through the inlet and out the pair of outlets of the first internal channel of the hub body, a second cord disposed within the second internal channel of the hub body and oriented such that a pair of ends of the second cord extend out the hub body, a first securement fastener coupled to the first end of the first cord and the first end of the second cord, the first securement fastener coupled to the first dog in the pair of dogs, and a second securement fastener coupled to the second end of the first cord and the second end of the second cord, the second securement fastener coupled to the second dog in the pair of dogs, wherein the user maneuvers the guide fastener to slidably adjust the first cord within the first internal channel and the second cord within the second internal channel of the hub body, thereby enhancing securement and control of the pair of dogs.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
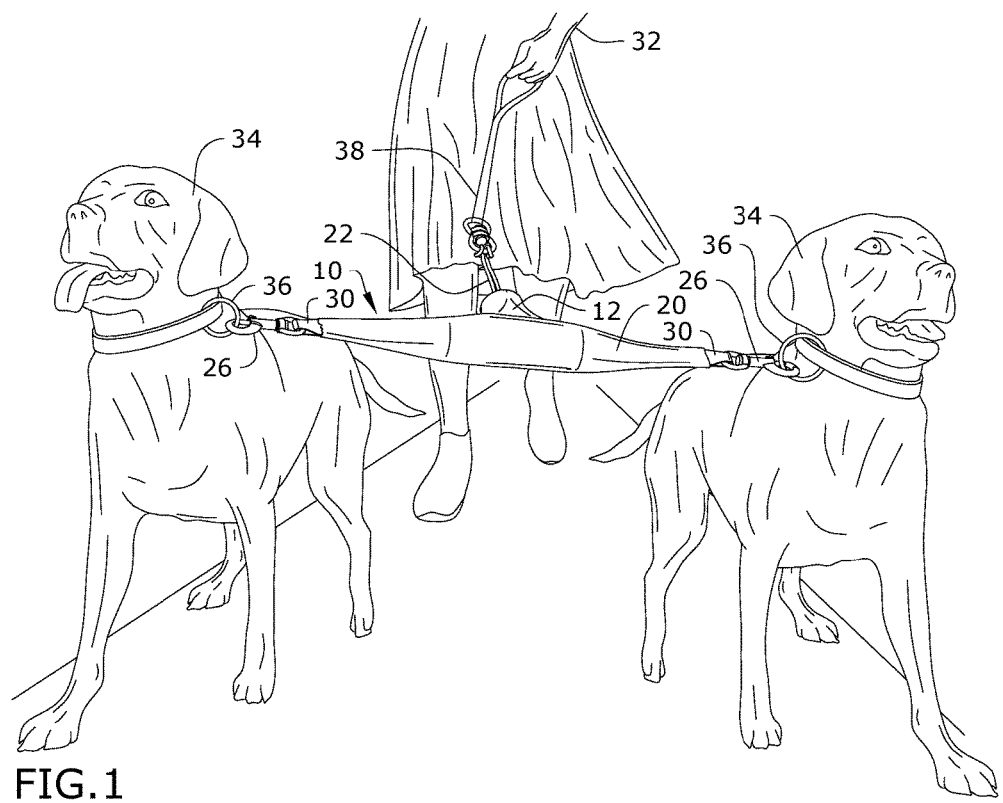
FIG. 1 depicts a perspective view of certain embodiments of the dual-pet leash shown in use.
Figure 2:
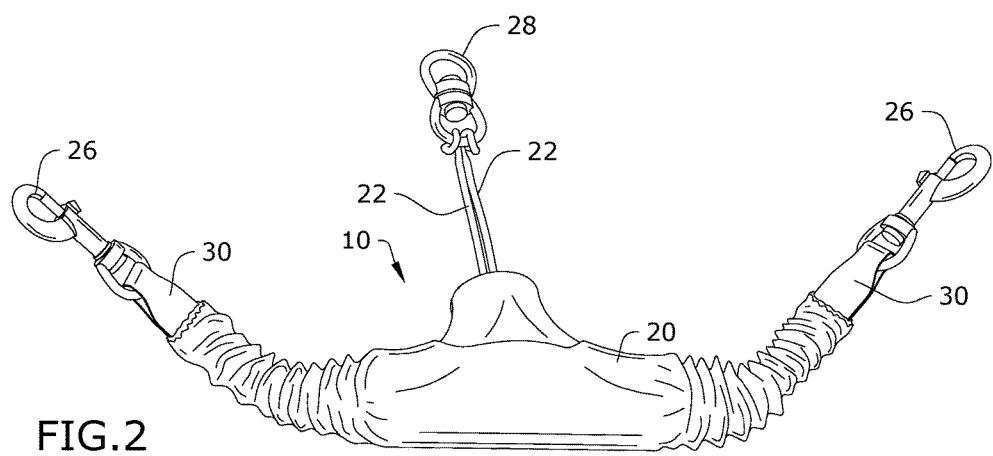
FIG. 2 depicts a perspective view of certain embodiments of the dual-pet leash.
Figure 3:
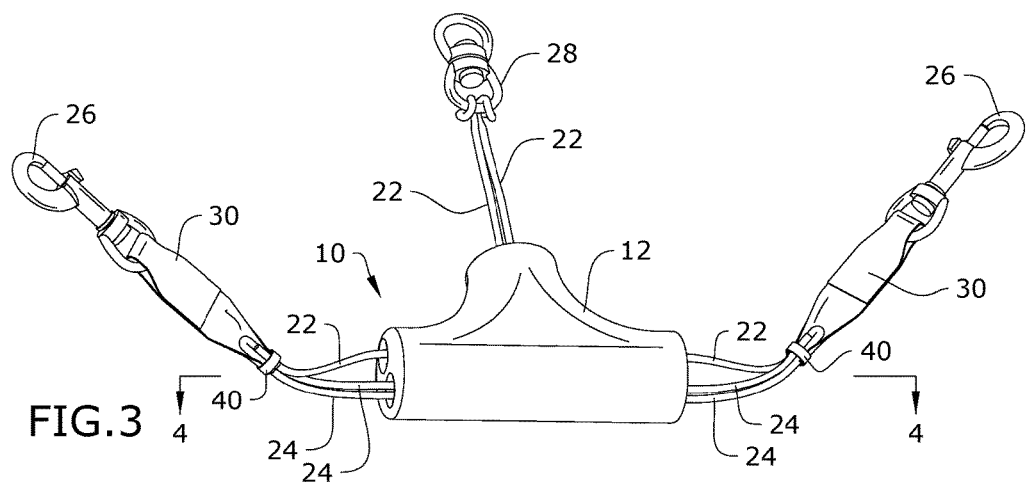
FIG. 3 depicts a perspective view of certain embodiments of the dual-pet leash with the cover removed for illustrative clarity.

As depicted in FIGS. 1-3, dual-dog leash 10 is configured for use by operator 32 to control a pair of dogs 34. Dual-dog leash 10 is designed to minimize cord entanglement and enhance stability and user control of dogs 34 when in use. Dual-dog leash 10 generally comprises hub body 12, static cord 22, elastic cords 24, leash 38, and mechanical fasteners including snap hooks 26 and double swivel D-ring 28.

Figure 4:
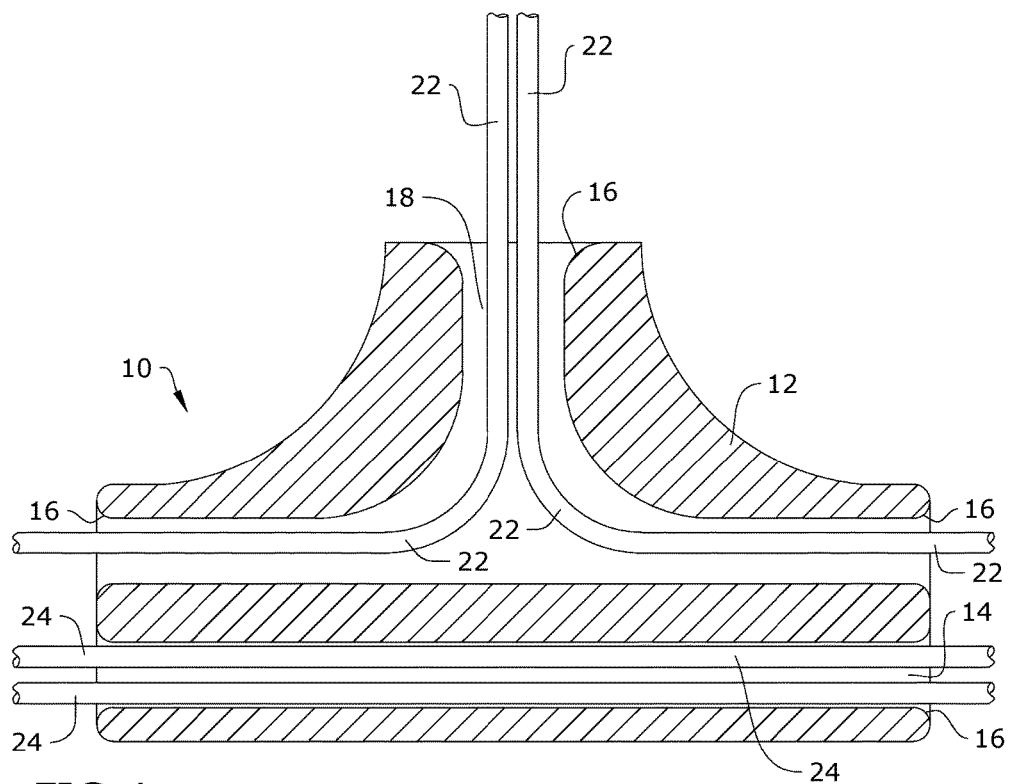
FIG. 4 depicts a section view of certain embodiments of the dual-pet leash taken along line 4-4 in FIG. 3.

As depicted in FIGS. 3-4, hub body 12 comprises first internal channel 18 and second internal channel 14. In one embodiment, first internal channel 18 comprises a generally T-shape with an inlet connected to a pair of outlets. First internal channel 18 is configured to receive static cord 22. Second internal channel 14 extends linearly within hub body 12 and comprises an inlet and an outlet. Second internal channel 14 is configured to receive elastic cords 24. The inlets and outlets of first internal channel 18 and second internal channel 14 comprise beveled edges 16. Beveled edges 16 remove any sharp corner edges that may cut and/or wear static cord 22 and elastic cords 24 upon surface contact or rubbing. Hub body 12 may be made from materials including, but not limited to, plastic, wood, metal, rubber, and the like. Although hub body 12 comprises an outer T-shape, it shall be appreciated that the exterior may have variable shapes.

Static cord 22 is a cord with high flexion and tensile strength such as 550 paracord or other type of military-grade paracord. Static cord 22 is disposed around a guide fastener such as double-swivel D-ring 28 so that ends of the cord extend through the inlet and opposing outlets of first internal channel 18 of hub body 12. Leash 38 is coupled to another portion of double-swivel D-ring 28 as depicted in FIG. 1. Operator 32 grabs leash 38 during the operation of dual-dog leash 10.

Figure 5:
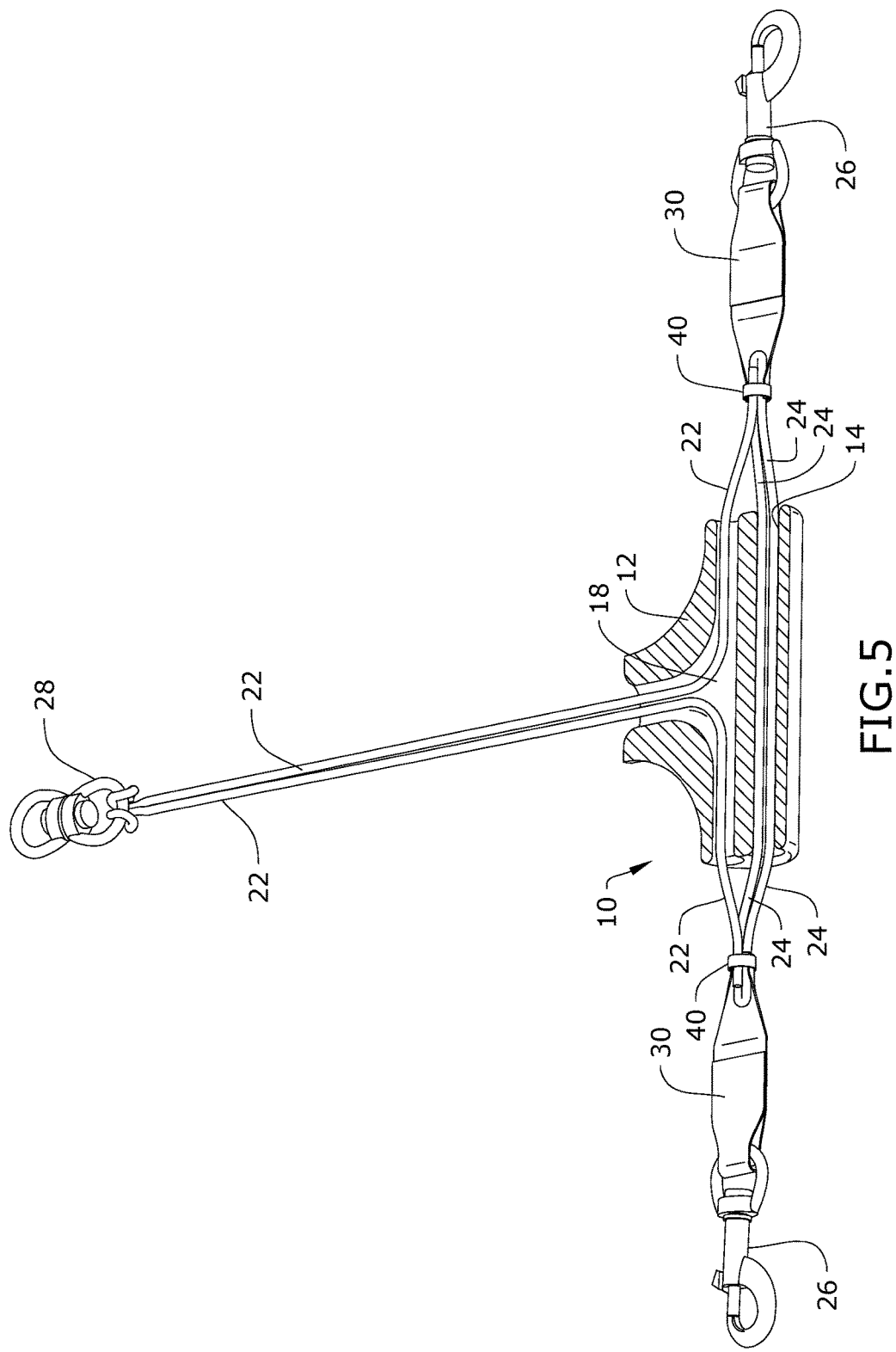
FIG. 5 depicts a cutaway view of certain embodiments of the dual-pet leash in an initial configuration.

As depicted in FIGS. 3-5, elastic cords 24 are disposed through second internal channel 14 such that portions/ends of cords 24 extend outside of hub body 12. Each elastic cord 24 is preferably made from any type of bungee material with a tubular shape for easier passage and maneuverability within second internal channel 14.

The exposed ends of static cord 22 and elastic cords 24 are coupled to a pair of strappings 30, which connect snap hooks 26 to cords 22, 24. Each strapping 30 is preferably made from nylon webbing. However, alternative materials may be used instead. In one embodiment, static cord 22 and elastic cords 24 are coupled to each strapping 30 by ring fastener 40, which may be a heat-shrunk band or alternative band that applies sufficient tension to secure the components together. In an alternative embodiment, static and elastic cords 22, 24 are secured to strapping 30 by mechanical fasteners such as staples. Alternatively, static and elastic cords 22, 24 can be sewn to strapping 30.

Each snap hook 26 is coupled to an end of strapping 30 and is configured to be secured to either collar 36 or a harness worn by dog 34. Snap hooks 26 are preferably swivel-snap hooks. However, alternative hook-style fasteners may be used instead. In an alternative embodiment, static cord 22 and elastic cords 24 can be directly attached to snap hooks 26. This eliminates the need for strappings 30.

In one embodiment, cover 20 is disposed around hub body 12 and exposed portions of both static cord 22 and elastic cords 24 as depicted in FIGS. 1-2. In one embodiment, cover 20 is coupled to strappings 30 by any fastening components such as stitching. Cover 20 is designed to protect components of dual-dog leash 10 and prevent debris such as dirt, twigs, rocks, and the like, from contacting and/or obstructing the movement of static and elastic cords 22, 24.

In one embodiment, cover 20 comprises an elastic portion and a static portion. In a preferred embodiment, the static portion of cover 20 extends around portions of hub body 12. The elastic portions of cover 20 extend from the ends of hub body 12 to strappings 30 proximate snap hooks 26. The static portion of cover 20 is made from a material such as canvas, which is sufficiently durable to protect hub body 12. The elastic portions of cover 20 are made from a material such as spandex. As depicted in FIGS. 1-2, the elastic portions of cover 20 stretch and compress. The elastic and static portions of cover 20 are preferably coupled together by stitching. However, alternative fasteners may be used instead.

Figure 6:
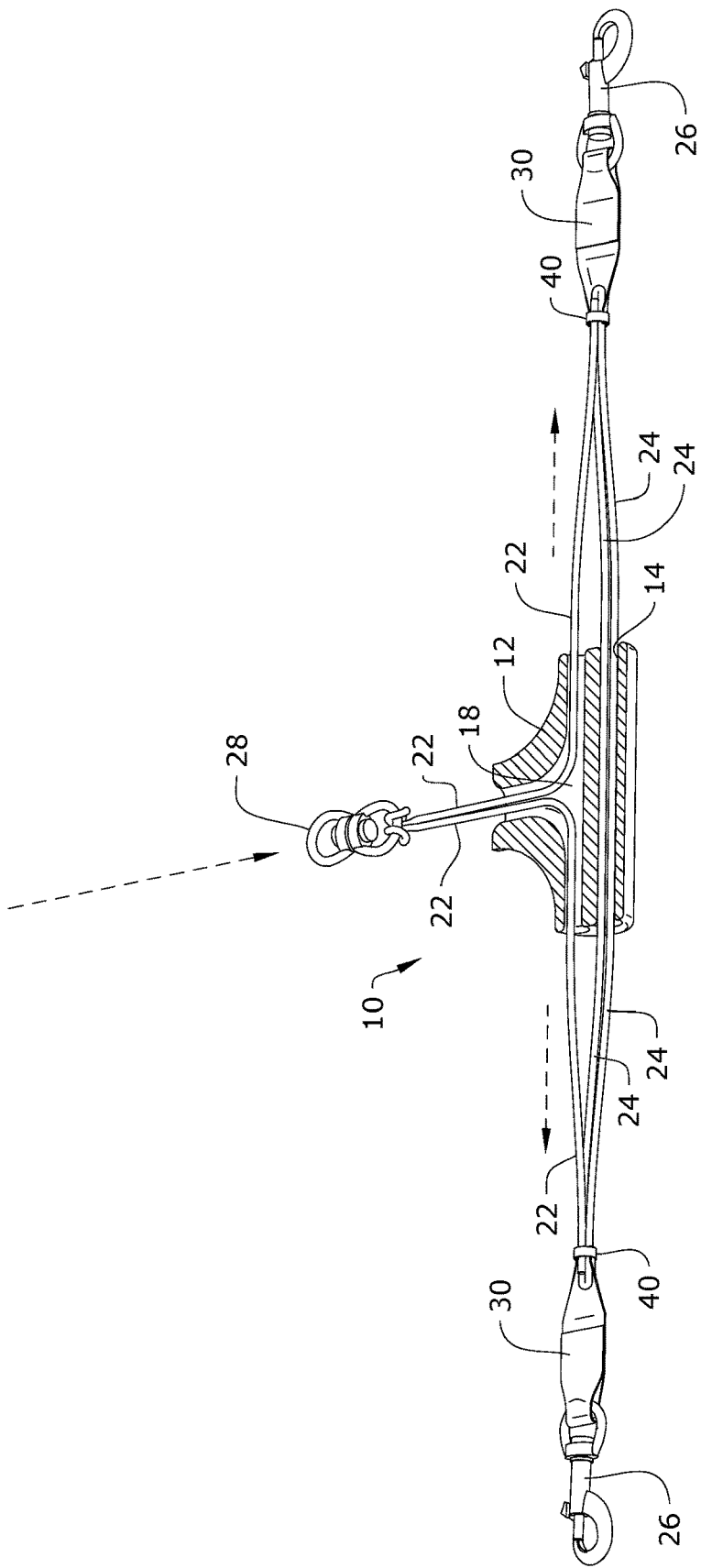
FIG. 6 depicts a cutaway view of certain embodiments of the dual-pet leash in a secondary configuration.

In operation, operator 32 secures dual-dog leash 10 to the pair of dogs 34. This is performed by securing snap hooks 26 to collars 36 worn by the pair of dogs 34. Operator 32 grabs leash 38 to maintain control of dogs 34 during a walk or run. As the pair of dogs 34 move, static and elastic cords 22, 24 slide within first and second internal channels 18, 14 of hub body 12 as depicted in FIGS. 5-6. By pulling on leash 38, static and elastic cords 22, 24 slide in the opposite direction of the arrows depicted in FIG. 6. This draws the pair of snap hooks 26 and the attached dogs 34 closer toward hub body 12, thereby permitting operator 32 to control dogs 34.

The design of dual-dog leash 10 is advantageous because it more effectively prevents the entanglement of cords/bands compared to prior art multi-pet leashes. In particular, double swivel D-ring 28 limits tangling that can occur when leash 38 and/or the exposed portion of static cord 22 are twisted. The separate pathways of first and second internal channels 18, 14 permit static cord 22 and elastic cords 24 to slide within hub body 12 without contacting each other. This greatly reduces the likelihood static cord 22 and elastic cords 24 tangle with each other during use of dual-dog leash 10. Finally, cover 20 protects components of dual-dog leash 10 and prevents debris such as rocks, twigs and the like, from contacting static cord 22 and elastic cords 24 and causing an entanglement.

The design of dual-dog leash 10 is also advantageous because it provides a more stable leash over prior devices by redistributing and/or balancing forces generated by dogs 34. This is accomplished primarily by the direct connection of the pair of dogs 34 together by elastic cords 24. The movement of one dog 34 away from the other dog 34 causes elastic cords 24 to stretch and generate a tension that applies a counter force to the moving dog to limit its movement. In addition, the elastic portions of cover 20 stretch as depicted in FIG. 1 to create a secondary source of tension that applies a counter force to the moving dog. This redistribution and balance of forces generated by dogs 34 causes the dogs to work against each other as they move further apart from one another. Ultimately, dual-dog leash 10 reduces the amount of effort required by operator 32 to control dogs 34. At any time, operator 32 has the capability of bringing dogs 34 together by pulling back on leash 38.

It shall be appreciated that several modifications can be made to dual-dog leash 10. For example, any number of static cords 22, elastic cords 24 and leashes 38 may be used in dual-dog leash 10 to vary the amount of tension in the members as desired by operator 32. In an alternative embodiment, additional components may be used with dual-dog leash 10 including, but not limited to, flashlights, cameras, reflective material, glow-in-the-dark materials, a dog waste bag dispenser, and the like.

In an alternative embodiment, a locking device can be used with dual-dog leash 10 to further limit the movement of dogs 34. In one embodiment, the locking device is coupled to static cord 22 between double-swivel D-ring 28 and hub body 12. The movement of one or both dogs away from each other causes static cord 22 to be fed into hub body 12 until the locking device contacts the inlet of first internal channel 18. This contact prevents further movement of static cord 22 into hub body 12 and dogs 34 away from each other because the locking device is larger than the size of the inlet opening of first internal channel 18.

Although embodiments of the invention have described dual-dog leash 10 for use with dogs 34, it shall be appreciated that the leash may be beneficial for use with any alternative types of pets, farm animals, and the like.

It shall be appreciated that the components of dual-dog leash 10 described in several embodiments herein may comprise any alternative known materials in the field and be of any color, size and/or dimensions. It shall be appreciated that the components of dual-dog leash 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A dual-pet leash for use by a user to secure a pair of dogs, the dual-pet leash configured to distribute and balance forces generated by the pair of secured dogs to enhance stability and user control, the dual-pet leash comprising:
  a hub body comprising a first internal channel and a second internal channel, the first internal channel comprising an inlet connected to a pair of outlets, the second internal channel disposed therethrough the hub body;
  a first cord coupled to a guide fastener and oriented such that a pair of ends of the first cord extend through the inlet and out the pair of outlets of the first internal channel of the hub body;
  a second cord disposed within the second internal channel of the hub body and oriented such that a pair of ends of the second cord extend out the hub body;
  a first securement fastener coupled to the first end of the first cord and the first end of the second cord, the first securement fastener coupled to the first dog in the pair of dogs; and a second securement fastener coupled to the second end of the first cord and the second end of the second cord, the second securement fastener coupled to the second dog in the pair of dogs;

wherein the user maneuvers the guide fastener to slidably adjust the first cord within the first internal channel and the second cord within the second internal channel of the hub body, thereby enhancing securement and control of the pair of dogs.

2. The dual-pet leash of claim 1, wherein the second cord is more elastic than the first cord.

3. The dual-pet leash of claim 2, further comprising a first strapping connecting the first securement fastener, the first end of the first cord and the first end of the second cord together, and a second strapping connecting the second securement fastener, the second end of the first cord and the second end of the second cord together.

4. The dual-pet leash of claim 3, wherein the first and second securement fasteners are snap hooks, wherein each snap hook is configured to couple to a collar worn by one of the pair of dogs.

5. The dual-pet leash of claim 4, wherein the guide fastener is a double swivel D-ring.

6. The dual-pet leash of claim 5, further comprising a leash coupled to a first end of the double swivel D-ring and the first cord coupled to a second end of the double swivel D-ring.

7. The dual-pet leash of claim 6, further comprising a protective cover member coupled to the first and second strappings and disposed around the hub body, first ends of the first and second cords, and second ends of the first and second cords.

8. The dual-pet leash of claim 7, wherein the protective cover member comprises a generally elastic portion and a generally static portion.

9. The dual-pet leash of claim 8, wherein the inlet and outlets of the first internal channel comprises beveled edges.

10. The dual-pet leash of claim 9, wherein the first cord is made from paracord and the second cord is made from bungee.

* * * * *